(12) United States Patent
Seto et al.

(10) Patent No.: US 8,581,527 B2
(45) Date of Patent: Nov. 12, 2013

(54) MECHANISM FOR CONVERTING ROTARY MOTION INTO LINEAR MOTION AND LIFTING DEVICE

(75) Inventors: Shinji Seto, Hitachinake (JP); Isamu Tsubono, Ushiku (JP); Kenji Hiraku, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 465 days.

(21) Appl. No.: 13/020,084

(22) Filed: Feb. 3, 2011

(65) Prior Publication Data

US 2011/0193500 A1    Aug. 11, 2011

(30) Foreign Application Priority Data

Feb. 5, 2010 (JP) ................................. 2010-024535

(51) Int. Cl.
*F16H 25/08* (2006.01)
(52) U.S. Cl.
USPC .................................. 318/14; 74/52; 310/80
(58) Field of Classification Search
USPC ............ 318/3, 9, 14, 15; 74/25, 52, 84 R, 89, 74/112; 310/75 R, 80, 83
See application file for complete search history.

(56) References Cited

U.S. PATENT DOCUMENTS

| | | | | |
|---|---|---|---|---|
| 3,965,761 A * | 6/1976 | Stanley | ...................... | 74/424.92 |
| 4,033,194 A * | 7/1977 | Stanley | ...................... | 74/424.92 |
| 7,589,445 B2 * | 9/2009 | Gandel et al. | ................... | 310/80 |
| 7,969,109 B2 * | 6/2011 | Masuo et al. | ................. | 318/437 |

FOREIGN PATENT DOCUMENTS

JP    2007-120658    5/2007

* cited by examiner

*Primary Examiner* — Bentsu Ro
(74) *Attorney, Agent, or Firm* — Antonelli, Terry, Stout & Kraus, LLP.

(57) ABSTRACT

There is provided a mechanism for converting rotary motion into linear motion in which high positioning accuracy can be obtained in mutual conversion between rotary motion and linear motion. The mechanism includes a plurality of rollers having a roller annular groove member and a pair of thrust bearings, a thrust bearing portion that is convex shaped and is held between the pair of thrust bearings on an outer surface of an end of the roller shaft, a step surface that is disposed on an inner surface of the roller annular groove member and facing to the thrust bearing portion putting one of the pair of thrust bearing in between, a thrust facing member that is in mesh with an inner surface of the roller annular groove member and is facing to the thrust bearing portion putting the other one of the pair of thrust bearing in between.

6 Claims, 7 Drawing Sheets

MECHANISM FOR CONVERTING ROTARY MOTION INTO LINEAR MOTION AND LIFTING DEVICE

CROSS REFERENCE TO RELATED APPLICATION

The present application claims benefit of the filing dates of Japanese Patent Application No. 2010-024535 filed on Feb. 5, 2010, which is incorporated herein by reference.

BACKGROUND OF THE INVENTION

1. Field of the Invention

The present invention relates to a mechanism for converting rotary motion into linear motion that mutually converts between rotary motion and linear motion, and relates to a lifting device that converts rotary motion of a rotary drive source such as a motor to linear motion for linearly driving an object.

2. Description of the Related Art

For example, in Japanese Patent Application Laid-open 2007-120658 (FIG. 2 and FIG. 11), there is proposed a mechanism for converting rotary motion into linear motion including, a rod having a threaded portion constituting its outer surface, a holder member disposed on the outer surface of the rod so as to be rotatable and movable in an axial direction relative to the rod, and a plurality of rollers that is supported rotatably on the holder member having a plurality of annular grooves that is in mesh with a threaded portion on an outer surface of the roller, and converts the rotation of the roller (holder member) into linear motion of the rod by the mesh.

In such a mechanism for converting rotary motion into linear motion, it is required, for example, to improve positioning accuracy in linear motion converted from rotary motion.

Accordingly, it is an objective of the present invention to provide a mechanism for converting rotary motion into linear motion that mutually converts between rotary motion and linear motion with high positioning accuracy, and to provide a lifting device that is equipped with the mechanism for converting rotary motion into linear motion.

SUMMARY OF THE INVENTION

A mechanism for converting rotary motion into linear motion according to the present invention comprises: a rod having a threaded portion constituting an outer circumferential surface thereof; a holder member disposed outside the outer circumferential surface of the rod; a plurality of rollers supported by the holder member and arranged on the rod in a manner that each of the rollers is disposed at an angle to the rod; the angle being substantially equal to a lead angle of the threaded portion; and the mechanism converting mutually between relative rotation between the rod and the holder member and relative linear motion between an axis of the rod and an axis of the holder member; wherein the roller further includes: a roller annular groove member having a plurality of annular grooves on an outer surface thereof, the plurality of annular grooves rolling on the rod while kept in mesh with the threaded portion; a roller shaft having both ends being supported by the holder member; a pair of thrust bearings that rotatably support the roller annular groove member around the roller shaft; a thrust bearing portion that is in a convex shape and is integrally formed with the roller shaft and is disposed between the pair of thrust bearings on an outer surface of an end of the roller shaft; a step surface that is formed on an inner surface of the roller annular groove member and disposed opposite to the thrust bearing portion holding a first one of the pair of thrust bearings in between; and a thrust facing member having an threaded outer surface thereof which is in mesh with an inner surface of the roller annular groove member and disposed across a second one of the pair of thrust bearings from the thrust bearing portion, the thrust facing member being spaced a distance from the step surface, the distance being alterable.

According to the present invention, there is provided a mechanism for converting rotary motion into linear motion in which high positioning accuracy can be obtained for mutual conversion between rotary motion and linear motion. Further, there is provided a lifting device equipped with the mechanism for converting rotary motion into linear motion.

DETAILED DESCRIPTION OF THE PREFERRED EMBODIMENTS

Next, a preferred embodiment of the present invention will be explained in detail referring to the drawings.

Figure 1:
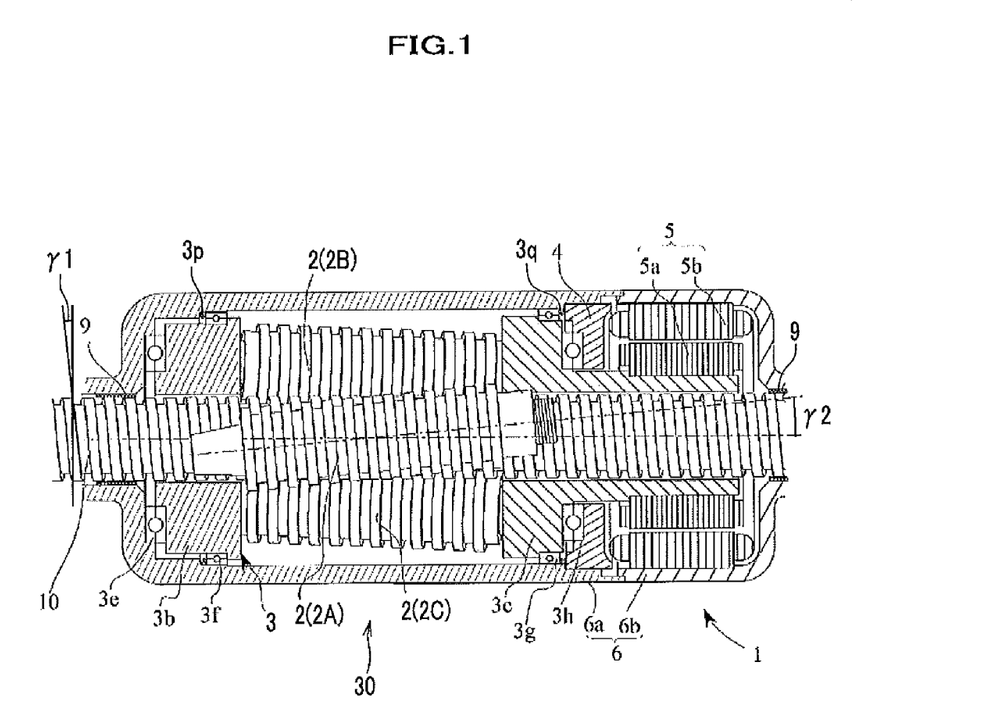
FIG. 1 shows a longitudinal sectional view of a mechanism for converting rotary motion into linear motion in accordance with an embodiment of the present invention, and also depicts rollers located in front of the cross-section.

FIG. 1 shows a longitudinal sectional view of a mechanism for converting rotary motion into linear motion in accordance with an embodiment of the present invention. To facilitate understanding of the structure of the mechanism for converting rotary motion into linear motion 1, FIG. 1 also includes a roller 2A which actually is located in front of the cross-section and normally does not exist in the plane of the cross section, while keeping the positional relationship.

The mechanism for converting rotary motion into linear motion 1 mainly comprises: a motor 5, a casing 6 having a left casing 6a and right casing 6b, a plurality of rollers (in the case of FIG. 1, there are 3 rollers 2: 2A, 2B, and 2C), and a rod 10. The rollers 2 (2A, 2B and 2C) revolve relative to the casing 6 by the power of the motor 5, and makes the rod 10 move linearly by the mesh between the annular grooves on the rollers 2 (2A, 2B and 2C) and the threaded portion of the rod 10.

The rod 10 has a threaded portion constituting its outer surface. A holder member 3 is disposed at the outer end of the rod 10. The holder member 3 includes, an endplate support pole 3a, a left holder end plate 3b, a right holder end plate 3c, a left holder thrust bearing 3e, a left holder radial bearing 3f, a right holder radial bearing 3g, a right holder thrust bearing 3h, and plate springs 3p and 3q. The end plate support pole 3a keeps a constant distance between the left holder end plate 3b and the right holder end plate 3c. The left holder end plate 3b and the right holder end plate 3c support both ends of the roller 2 (2A, 2B, 2C). The rollers 2 (2A, 2B, 2C) are arranged on the rod in a manner that each of the rollers is disposed at a shaft angle to the central axis of the rod 10 such that the shaft angle γ2 between the each central axis of the rollers and the central axis of the rod 10 is nearly equal to the lead angle γ1 of the threaded portion of the rod 10.

The left holder end plate 3b is rotatably supported on the left casing 6a by the left holder thrust bearing 3e and the left holder radial bearing 3f. The plate spring 3p is held between the left casing 6a and the left holder radial bearing 3f, and presses the left holder end plate 3b via the left holder radial bearing 3f toward the rollers 2 (2A, 2B, 2C).

The right holder end plate 3c is rotatably supported on the left casing 6 by the right holder thrust bearing 3h and the bearing support member 4 and the right holder radial bearing 3g. The plate spring 3q is held between the bearing support member 4 which is fixed on the left casing 6 and the right holder radial bearing 3g, and presses the right holder end plate 3c via the right holder radial bearing 3g toward the rollers 2 (2A, 2B, 2C).

The right holder end plate 3c is in a cylindrical shape extending to the right casing 6b and disposed outside the circumference of the rod 10. In the right casing 6b, a rotor 5a of the motor 5 is disposed on the right holder end plate 3c. A stator 5b of the motor 5 is press fitted in the right casing 6b so as to face the rotor 5a. The rotor 5a is a part of the motor 5. When the rotor 5a rotates relative to the stator 5b, simultaneously rotate the right holder end plate 3c, the roller 2 (2A, 2B, 2C), and the left holder end plate 3b relative to the casing 6 (the left casing 6a and the right casing 6b). The motor 5 is coupled together with the holder member 3, and makes rotation of the holder member 3 and the roller 2 (2A, 2B, 2C) relative to the casing 6.

The casing 6 is made so that the rod 10 is movable in an direction parallel to the central axis of the rod 10. This movement is so called "linear slide". Thus, rotation of the motor 5 makes the holder member 3 and the roller 2 (2A, 2B, 2C) revolve around the rod 10. The rod 10 has a threaded portion constituting its outer surface. The roller 2 (2A, 2B, 2C) and the holder member 3 move in an axial direction relative to the rod 10 when the rollers 2 (2A, 2B, 2C) roll on the threaded portion of the rod 10 while each of the rollers rotating and simultaneously revolving around the rod 10. This conversion from the revolution to relative movement in the axial direction is reversible, and therefore conversion from relative movement in the axial direction to revolution is also possible.

The casing 6 has a small diameter portion formed on both ends in a direction of the central axis. The inner diameter of the small diameter portion is set to be slightly larger than the outer diameter of the rod 10. The central axis of inner wall of the small diameter portion is designed with a comparable accuracy to that of the central axis of the inner wall of the casing 6 to which holder radial bearings 3f and 3g are attached so as to match the central axis of the rod 10. As shown in FIG. 1, there may be, but not necessarily, a rack rod rail disposed on the inner wall of the small diameter portion. The left casing 6a and the right casing 6b are connected, for example, with a screw to form the casing 6.

Meanwhile, an integrated structure made by having the rollers 2 (2A, 2B, 2C) and the holder member 3 in mesh with each other is called a sub-assembly 30. This is because; the assembled sub-assembly 30 can be used as one of components in the assembly of the mechanism for converting rotary motion into linear motion 1.

Figure 2:
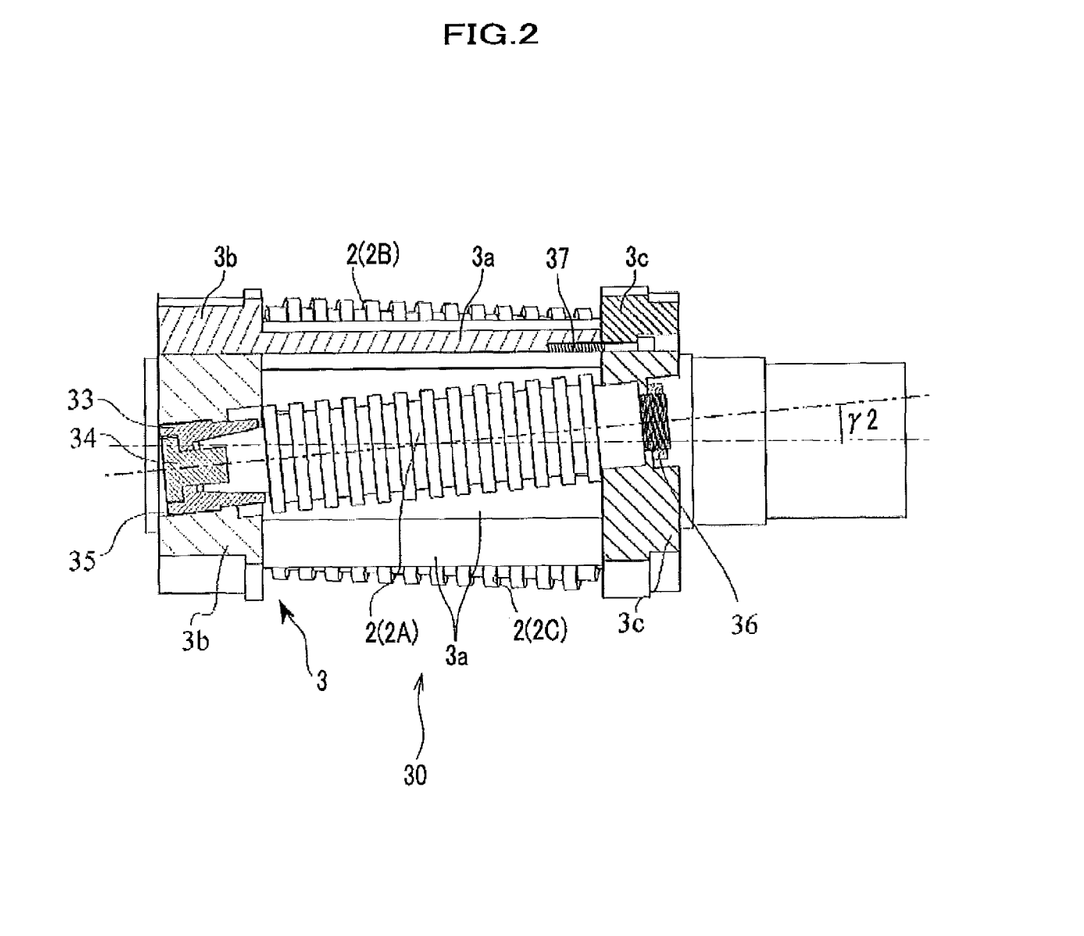
FIG. 2 is a side view of a sub-assembly which constitutes the mechanism for converting rotary motion into linear motion in accordance with an embodiment of the present invention, including a cross-section of a part of the holder member which constitutes the sub-assembly.

FIG. 2 illustrates a side view of the sub-assembly 30 constituting a mechanism for converting rotary motion into linear motion 1 according to an embodiment of the present invention. To facilitate understanding of the structure of the sub-assembly 30, FIG. 2 also depicts a cross-section of a part of the roller 2A and the holder member 3. Here, the only difference of the roller 2B and 2C from the roller 2A is that the location of the central shaft of the annular groove which is disposed on the outer surface thereof is shifted according to the threaded portion of the rod 10 (see FIG. 1), and other respects are the same as the structure of the roller 2A. Therefore, the roller 2A will be explained as an example below.

The outer surface of the right end of the roller 2A is threaded, and the right end of the roller 2A is mounted into a right holder end plate 3c and is fixed with a roller locking nut 36.

The left end portion of the roller 2A is tapered. A through-hole 35 is formed in a left holder endplate 3b so that the left end portion of the roller 2A which is tapered is inserted. A roller attaching member 33 is embedded into the through-hole 35 from a side opposite to a side the roller 2A is inserted. The embedded roller attaching member 33 has a structure so as not to pass through the through-hole 35 toward the side to which the roller 2A is inserted. The inner surface of the roller attaching member 33 is formed in a tapered shape. When the left end portion of the roller 2A is inserted into the embedded roller attaching member 33, each tapered surface contacts to each other along the whole periphery area, which prevents undesirable displacement of the central axis of the roller 2A. The inner surface of the left end of the roller 2A is threaded, and the left end of the roller 2A is fit into a left holder end plate 3b and is mounted with a bolt 34.

The left holder end plate 3b and the right holder end plate 3c are fixed to each other by the end plate support pole 3a for holding the roller 2A. The end plate support pole 3a is integrated as a part of the left holder end plate 3b, and fixed with the right holder end plate 3c by a screw 37. The roller 2A is disposed so that the central axis thereof is slanted to the central axis of the holder member 3 with a shaft angle γ2 which is nearly equal to the lead angle γ1 of the threaded portion of the rod 10.

Figure 3:
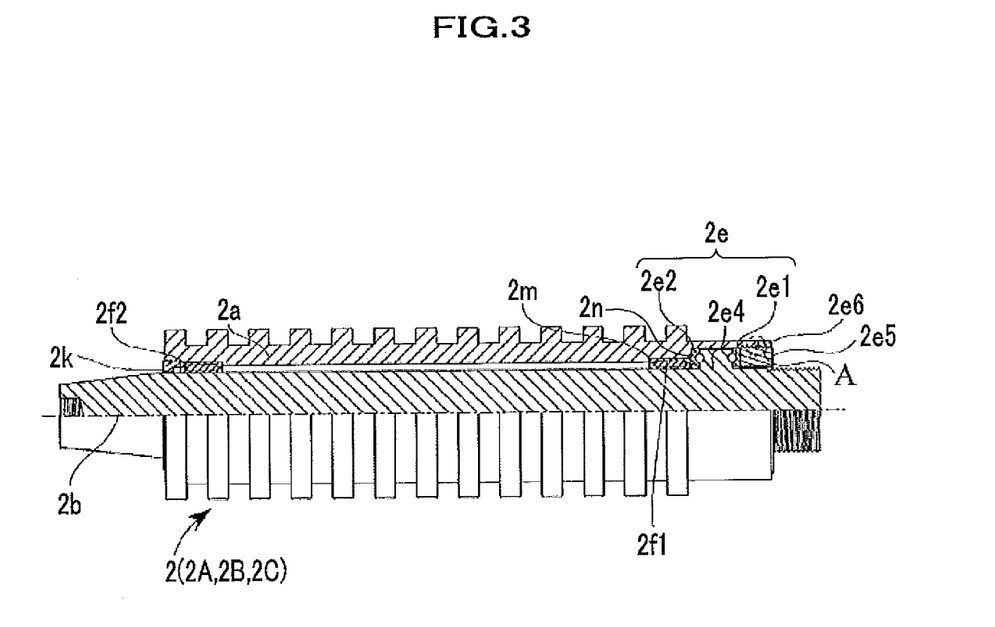
FIG. 3 is a side view (inferior half) and a sectional view (superior half) of the roller which constitutes the sub-assembly.

FIG. 3 illustrates a side view (inferior half of FIG. 3) and a sectional view (superior half of FIG. 3) of the roller 2 (2A, 2B, 2C). Each of the rollers 2 (2A, 2B, 2C) includes a roller annular groove member 2a having a plurality of annular grooves that rotates while kept in mesh with the threaded portion of the rod 10 (see FIG. 1) on an outer surface thereof, a roller shaft 2b having both ends being supported by and fixed to the left holder end plate 3b and the right holder end plate 3c of the holder member 3 (see FIG. 2).

The annular groove of the roller annular groove member 2a is different from the threaded portion of the rod 10 and not spiral, but a plurality of annular grooves are arranged at a constant interval along the central axis. The roller annular groove member 2a is rotatably supported around the roller shaft 2b by a pair of thrust bearing which includes a pair of roller thrust bearings 2e, and by a right roller radial bearing 2f1 and a left roller radial bearing 2f2. The roller annular groove member 2a has a cylindrical shape, having a through-hole inside, and the roller shaft 2b is allocated so as to pass through the inside of the roller annular groove member 2a.

A step portion (step surface) is formed at the left end of the roller annular groove member 2a having an inner surface, the radius of the inner surface of the step portion being larger than that of the inner surface of the central portion. The outer race of the left roller radial bearing 2f2 abuts against the step portion (step surface). The inner surface of the left end of the roller annular groove member 2a is threaded, to which the outer surface of the locking nut 2k is in mesh. When being screwed tight, the locking nut 2k is pressed against the outer race of the left roller radial bearing 2f2. The outer race of the left roller radial bearing 2f2 is held between the step portion (step surface) at the left end of the roller annular groove member 2a and the locking nut 2k. The inner race of the left roller radial bearing 2f2 is pressed and abuts against the roller shaft 2b.

A first step portion (step surface) 2m and a second step portion (step surface) 2n are formed at the right end of the roller annular groove member 2a, at which the right roller radial bearing 2f1 and the pair of roller thrust bearings 2e are arranged close to each other. The pair of roller thrust bearings 2e includes: a right rotation circle ring (a right roller thrust bearing) 2e1 and a left rotation circle ring (a left roller thrust bearing) 2e2, and a thrust bearing portion 2e4 which is disposed between the right rotation circle ring 2e1 and the left rotation circle ring 2e2. The pair of roller thrust bearings 2e is pressed with a thrust facing member 2e5 and a locking nut 2e6. Further detail will be explained referring to FIG. 4.

Figure 4:
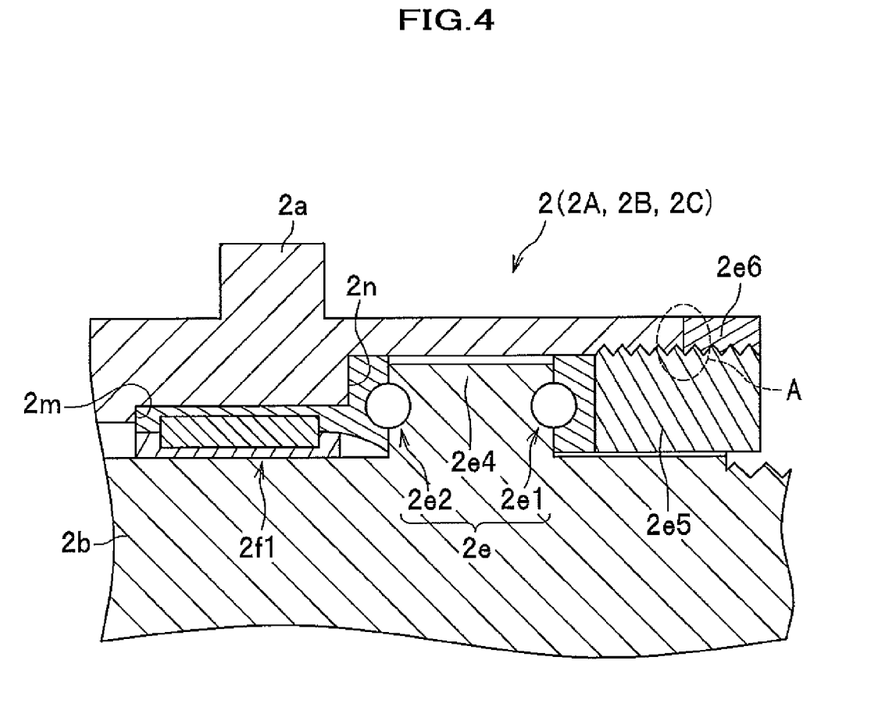
FIG. 4 is an enlarged view of FIG. 3, with respect to a cross-section of the periphery of a pair of roller thrust bearing of the roller.

FIG. 4 is an enlarged view of FIG. 3 which includes the periphery of a pair of roller thrust bearing of the roller. At the right end of the roller annular groove member 2a, there are provided the first step portion (step surface) 2m having an inner surface, whose radius is larger than that of the inner surface of the central portion, and the second step portion (step surface) 2n having an inner surface, whose radius is larger than that of the inner surface of the first step portion (step surface) 2m. The outer race of the right roller radial bearing 2f1 is disposed so as to abut against the first step portion (step surface) 2m. The inner race of the right roller radial bearing 2f1 is press fitted to the roller shaft 2b.

The thrust bearing portion 2e4 is disposed along the circumference of the outer surface on one end of the roller shaft 2b. The thrust bearing portion 2e4 is in a convex shape on the outer surface of the roller shaft 2b, and the cross-section is approximately rectangle. The radial height of the thrust bearing portion 2e4 is larger than that of the first step portion (step surface) 2m, and is smaller than that of the second step portion (step surface) 2n. The thrust bearing portion 2e4 forms an integral one piece together with the roller shaft 2b. The integration means that, there is no gap or looseness between the thrust bearing portion 2e4 and the roller shaft 2b. For example, the thrust bearing portion 2e4 and the roller shaft 2b are made from a single bulk, or are welded together. Alternatively, the thrust bearing portion 2e4 and the roller shaft 2b may be bonded with adhesive. Screw mounting is not preferable since the screw may be loosened after used for a long time.

On both ends of the central axis of the thrust bearing portion 2e4, there are provided the right roller thrust bearing 2e1 and the left roller thrust bearing 2e2 which works as a pair of the thrust bearings. The right roller thrust bearing 2e1 and the left roller thrust bearing 2e2 hold the thrust bearing portion 2e4.

The second step portion (step surface) 2n is formed on the inner hole surface of the roller annular groove member 2a, and faces the thrust bearing portion 2e4 putting the left rotation circle ring (left roller thrust bearing) 2e2 in between. The left rotation circle ring 2e2 is held between the thrust bearing portion 2e4 and the second step portion (step surface) 2n via the ball of the left roller thrust bearing 2e2. The left rotation circle ring 2e2 forms an integral one piece together with the right roller radial bearing 2f1. This integration makes it compact and contributes to the downsizing of the mechanism for converting rotary motion into linear motion 1.

The outer surface of the thrust facing member 2e5 is threaded and is in mesh with the inner surface, which is also threaded, of the end of the roller annular groove member 2a. The thrust facing member 2e5 faces the thrust bearing portion 2e4 putting the right rotation circle ring (right roller thrust bearing) 2e1 in between. The right rotation circle ring 2e1 is held between the thrust bearing portion 2e4 and the thrust facing member 2e5 via the ball of the left roller thrust bearing 2e1.

The distance between the thrust facing member 2e5 and the second step portion (step surface) 2n is narrowed or widened by screwing tight or loose the thrust facing member 2e5. When the thrust facing member 2e5 is screwed tight, the distance between the thrust facing member 2e5 and the second step portion (step surface) 2n becomes smaller, and the right rotation circle ring (right roller thrust bearing) 2e1 and the left rotation circle ring (left roller thrust bearing) 2e2 can be preloaded by pressure. Thus it is possible to avoid the occurrence of looseness at the right rotation circle ring (right roller thrust bearing) 2e1 and the left rotation circle ring (left roller thrust bearing) 2e2. The left rotation circle ring 2e2 which forms a part of the right roller radial bearing 2f1 contacts and presses against not only the second step portion (step surface) 2n but also the first step portion (step surface) 2m. Thus the outer race of the right roller radial bearing 2f1 is fixed.

The inner hole surface of the locking nut 2e6 is threaded and is in mesh with the outer surface of the thrust facing member 2e5. By screwing tight the locking nut 2e6 and pressing it against the end face of the roller annular groove member 2a, the outer surface of the thrust facing member 2e5 can be fixed to the inner surface of the roller annular groove member 2a without looseness due to the double nut effect. In this state, descriptions will be provided below about a case in which a thrust load directed from right to left, and another case in which a thrust force directed from left to right, is applied to the roller annular groove member 2a along the central axis due to the load generated by the mesh with the threaded portion of the rod 10.

Figure 5:
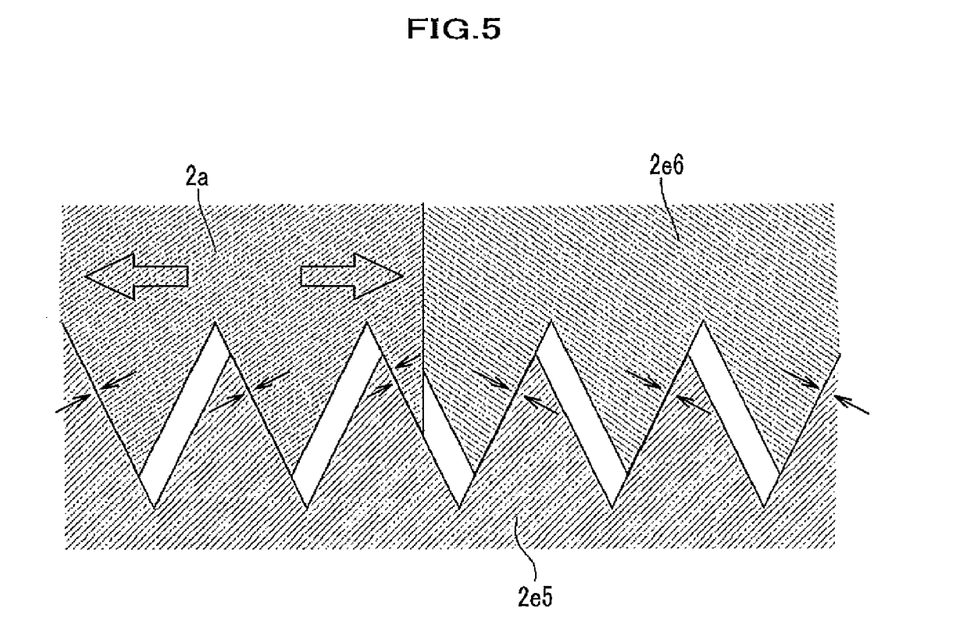
FIG. 5 is an enlarged view, of a part A in FIG. 3, with respect to a cross-section of the periphery of the thrust facing member of the roller.

FIG. 5 is an enlarged view of a part A in FIG. 3 and FIG. 4, with respect to a portion where the thrust facing member 2e5 contacts the roller annular groove member 2a and the locking nut 2e6. In a case when a force directed from left to right, which is indicated by the right arrow in FIG. 5, is applied to the roller annular groove member 2a, the load is received by the left rotation circle ring 2e2. Therefore, as shown in FIG. 5, the right side portion of the thrust facing member 2e5 and the left side portion of the roller annular groove member 2a are hold in contact with each other, and the axial positional relationship is not changed among the thrust bearing portion 2e4, the thrust facing member 2e5, and the roller annular groove member 2a. In a case when a force directed from right to left, which is indicated by the left arrow in FIG. 5, is applied to the roller annular groove member 2a, the positional relationship is kept unchanged due to the locking nut 2e6 between the thrust facing member 2e5 and the roller annular groove member 2a, and therefore the positional relationship in an axial direction is not changed with respect to the roller annular groove member 2a even if a force directed from right to left is applied to the roller annular groove member 2a. Consequently, even if the direction of the thrust load is changed, the position can be determined without causing position slippage. In addition, it is possible to apply constant pressure over time on the right rotation circle ring (right roller thrust bearing) 2e1 and the left rotation circle ring (left roller thrust bearing) 2e2, which leads to the high positioning accuracy. Further, since there is no aging degradation, it is possible to set the pressure in a minimum necessary value from the early stage, which results in the improvement of the conversion efficiency between rotary motion and linear motion.

Figure 6:
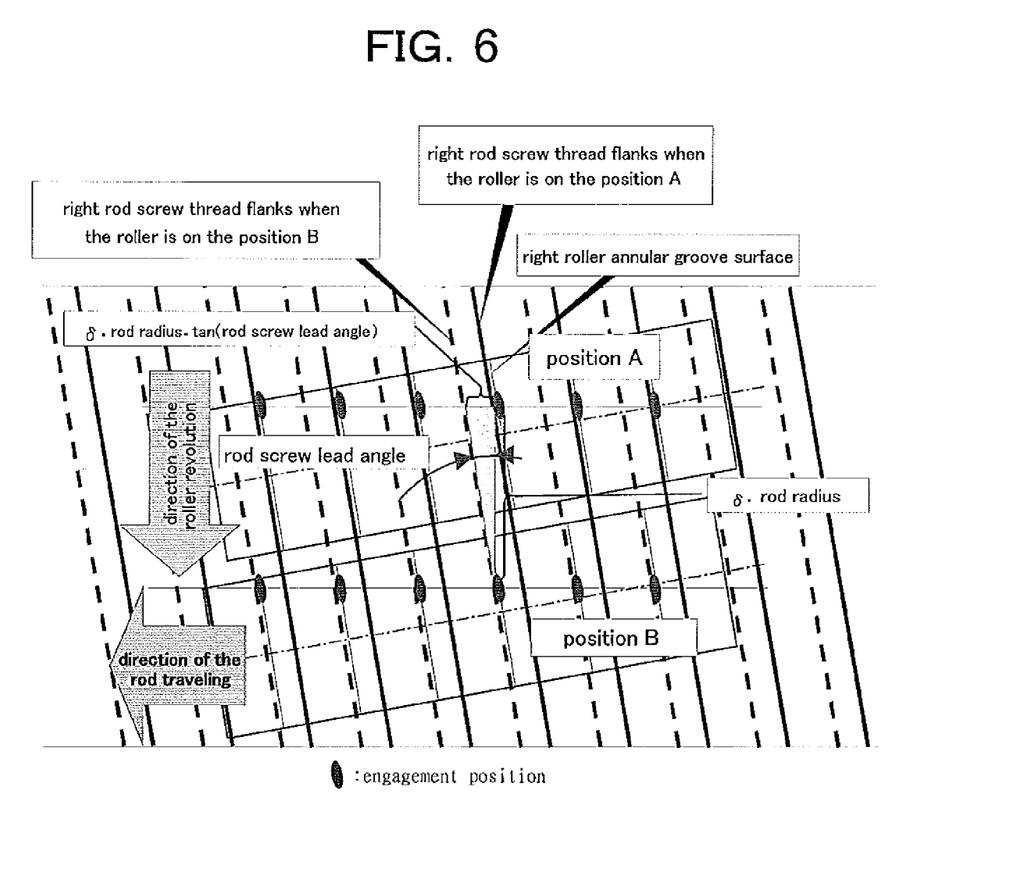
FIG. 6 is a conceptual diagram for explaining operation of the mechanism for converting rotary motion into linear motion in accordance with an embodiment of the present invention.

Next, referring to FIG. 6, the operation of the mechanism for converting rotary motion into linear motion 1 (shown in FIG. 1) will be explained. FIG. 6 illustrates a development view obtained by developing the outer surface (threaded portion) of the rod 10 on a plane surface for explaining the principle of operation. According to the development view, first the motor 5 rotates, which makes the holder member 3 rotate and in addition the roller 2A revolve around the axis of the rod 10, then the roller 2A moves from Position A to Position B, that is perpendicularly from top to direct down in the development view of FIG. 6. The thick lines which are drawn at a constant interval and decline diagonally downward right represent right rod thread flanks when the roller 2A is located at Position A. Then assume that the roller A revolves around the axis of the rod 10 by δ radian and moves on the circumference of the rod 10 by a distance (δ·(rod radius)) from Position A and reaches Position B. Then the position of the right surface of the roller annular groove does not move in the axial direction of the central axis of the rod 10 (horizontal direction in the development view) but moves only in the vertical direction in the development view. Consequently, the rod 10 moves in the axial direction of the central axis (horizontal direction in the development view) by a distance defined by (δ·(the rod radius)·tan(γ1(the rod screw lead angle))), and the right rod thread flanks move from the position shown by the thick lines to the position shown by the dashed lines, then the roller annular groove of the roller 2a is kept in mesh with the thread of the rod 10. Thus the conversion of rotary motion into linear motion takes place.

Here, the distance M of the rod 10 per a rotation of the motor 5 is defined by, $M=2\pi \cdot (\text{the rod radius}) \cdot \tan(\gamma 1(\text{the rod screw lead angle}))$, assuming that $\delta=2\pi$. As shown in this equation, it is possible to decrease the moving distance M by reducing the rod screw lead angle γ1. Meanwhile, the mesh portion is defined by the mesh between the annular groove surface of the roller 2A and the thread flanks of the rod 10. In other words, it is mesh between surfaces having small curvature. Therefore, contact in a wide area takes place, and the maximum value of a generated stress (Hertz stress) can be controlled. Thus, according to the mechanism for converting rotary motion into linear motion 1, a load applied to each mesh portion is increased. As a result, it is possible to generate a large thrust force with a compact mechanism.

Figure 7:
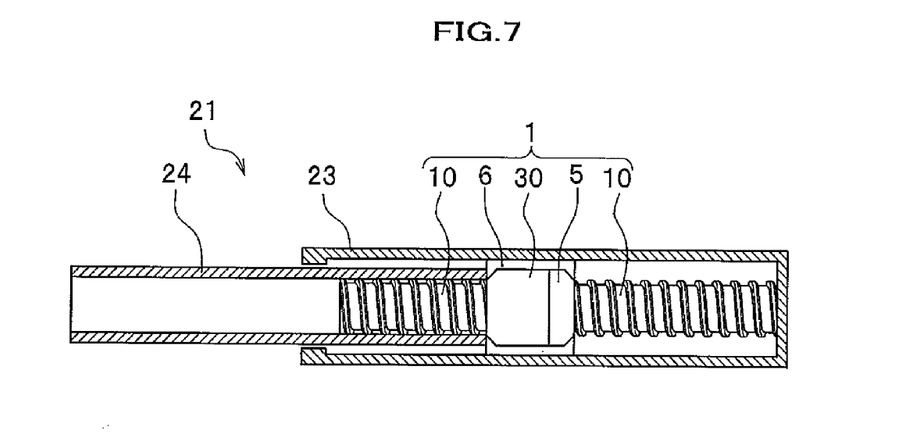
FIG. 7 is a schematic diagram of a linear actuator using the mechanism for converting rotary motion into linear motion in accordance with an embodiment of the present invention.

FIG. 7 is a schematic diagram of a linear actuator (mechanism for converting rotary motion into linear motion) 21 using the mechanism for converting rotary motion into linear motion 1 in accordance with an embodiment of the present invention. The linear actuator (mechanism for converting rotary motion into linear motion) 21 includes the mechanism for converting rotary motion into linear motion 1 explained above. The mechanism for converting rotary motion into linear motion 1 includes, as explained above, the rod 10, the motor 5, the casing 6, and the sub-assembly 30. The linear actuator 21 includes, in addition to the mechanism for converting rotary motion into linear motion 1, a linear slider (outer cylinder) 23, and an extensible inner cylinder (internal cylinder) 24 which is attached to the casing 6. The linear slider (outer cylinder) 23 stores the cylindrical casing 6 so that the cylindrical casing 6 is slidable in an axial direction of the axis of the rod 10. Thus, when the motor 5 rotates, the sub-assembly 30 also rotates. This rotation of the sub-assembly 30 relative to the casing 6 and the rod 10 produces a relative linear motion of the rod 10 in a direction of the central axis between the casing 6 and the rod 10. The casing 6 is disposed inside the linear slider (outer cylinder) 23 so as to slide in a direction of the central axis of the rod 6. The extensible inner cylinder (internal cylinder) 24 is attached to the casing 6 so that the length of the exposed portion of the extensible inner cylinder (internal cylinder) 24 out of the linear slider (outer cylinder) 23 can be altered according to the slide of the casing 6. Thus the length of the linear actuator 21 can be axially extended or shortened.

In particular, since the mechanism for converting rotary motion into linear motion 1 according to the embodiment of the present invention can accurately adjust a position without causing slippage, using of this can provide the linear actuator 21 with high positioning accuracy. In addition, since the mechanism for converting rotary motion into linear motion 1 is arranged inside the linear slider (outer cylinder) 23 and is covered by the linear slider (outer cylinder) 23 and the extensible inner cylinder (internal cylinder) 24, which prevents foreign matter from getting into the mechanism for converting rotary motion into linear motion 1, using of this can provide the linear actuator 21 with high reliability. Further, since using of the mechanism for converting rotary motion into linear motion 1 according to the embodiment of the present invention can reduce the size of the linear actuator 21 in a radial direction of the mechanism for converting rotary motion into linear motion 1, it also reduces the size in a radial direction of the linear slider (outer cylinder) 23 and further in a radial direction of the linear actuator 21.

Figure 8:
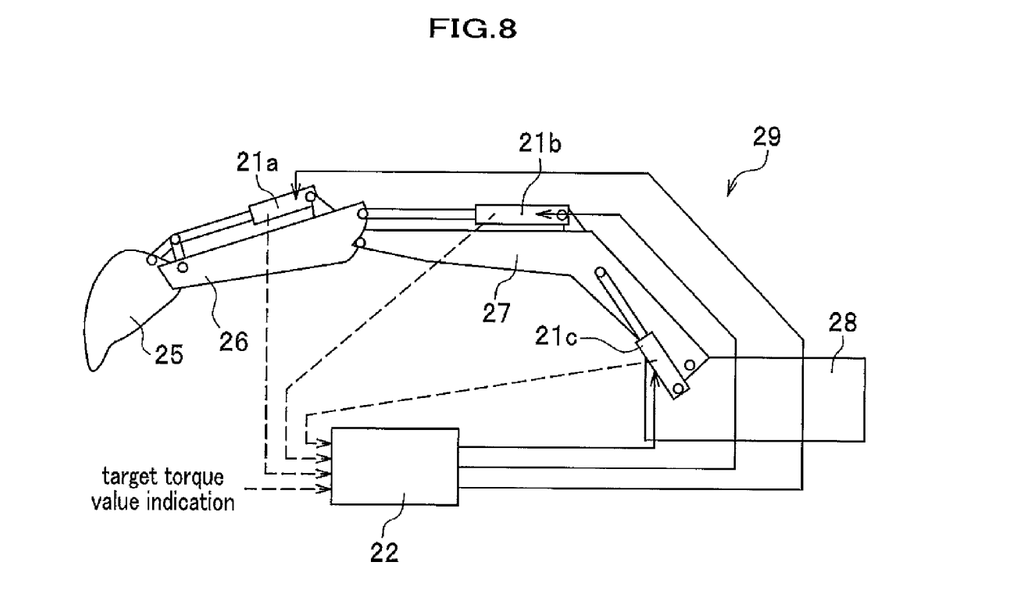
FIG. 8 is a schematic diagram of a lifting device (construction machine) equipped with a linear actuator using the mechanism for converting rotary motion into linear motion in accordance with an embodiment of the present invention.

FIG. 8 is a schematic diagram of a shovel 29 equipped with a linear actuator (mechanism for converting rotary motion into linear motion) 21 (21a, 21b, 21c) using the mechanism for converting rotary motion into linear motion 1 in accordance with an embodiment of the present invention. The shovel 29 is equipped with the plurality of linear actuators 21a to 21c which have the same structure as that of the linear actuator 21 in FIG. 7. The shovel 29 includes a bucket 25, an arm 26, a boom 27, an upper revolving deck 28, and a controller 22, in addition to the linear actuator 21a to 21c. The bucket 25 is rotatably attached directly to the arm 26, and also indirectly to the arm 26 via the linear actuator 21a. The bucket 25 can be turned around the arm 26 by elongating and contracting the linear actuator 21a. The arm 26 is rotatably attached directly to the boom 27, and also indirectly to the boom 27 via the linear actuator 21b. The arm 26 can be turned around the boom 27 by elongating and contracting the linear actuator 21b. The boom 27 is rotatably attached directly to the upper revolving deck 28, and also indirectly to the upper revolving deck 28 via the linear actuator 21c. The boom 27 can be turned around the upper revolving deck 28 by elongating and contracting the linear actuator 21c. The upper revolving deck 28 is pivotably arranged on a lower driving mechanism (not shown).

The controller 22 is capable of measuring a motor current flowing in the motor 5 (see FIG. 7) of the linear actuator (mechanism for converting rotary motion into linear motion) 21 (21a, 21b, 21c). A target value of a motor current which should be flown through the motor 5 (linear actuator 21a, 21b, 21c) is calculated based on the measured current value and a torque indication (a target torque value) provided by a driver, and then the calculated motor current is applied to the motor 5 (linear actuator 21a, 21b, 21c). Thus, an appropriate torque is obtained.

Here, the linear actuator (mechanism for converting rotary motion into linear motion) 21 (21a, 21b, 21c) can only absorb lower load compared to a hydraulic system, which could lead to occurrence of looseness in the linear actuator (mechanism for converting rotary motion into linear motion) 21 (21a, 21b, 21c) in a case when excessive load is applied to the bucket 25 etc.

For this reason, the controller, in a case when the measured value has exceeded a predetermined value, controls the target value not to exceed the predetermined value. Thus, it is possible to control the motor current not to exceed the predetermined value in a case when excessive load is applied, which can avoids overload and prevent the occurrence of looseness. In addition, since the linear actuator (mechanism for converting rotary motion into linear motion) 21 (21a, 21b, 21c) is free from looseness, it is possible to reduce the tracking delay in feedback control of positioning control.

Although an example of the shovel 29 has been explained above, the present invention may be adopted to various types of devices that require features similar to the linear actuator 21, 21a to 21c, for example, a lifting device such as a construction machine or a molding machine that accompanies lifting motion, and all types of devices that accompany horizontal motion.

What is claimed is:

1. A mechanism for converting rotary motion into linear motion, comprising:
   a rod having a threaded portion constituting an outer circumferential surface thereof;
   a holder member disposed outside the outer circumferential surface of the rod;
   a plurality of rollers supported by the holder member and arranged on the rod in a manner that each of the rollers is disposed at an angle to the rod; the angle being substantially equal to a lead angle of the threaded portion; and
   the mechanism converting mutually between relative rotation between the rod and the holder member and relative linear motion between an axis of the rod and an axis of the holder member;
   wherein the roller further includes:
   a roller annular groove member having a plurality of annular grooves on an outer surface thereof, the plurality of annular grooves rolling on the rod while kept in mesh with the threaded portion;
   a roller shaft having both ends being supported by the holder member;
   a pair of thrust bearings that rotatably support the roller annular groove member around the roller shaft;
   a thrust bearing portion that is in a convex shape and is integrally formed with the roller shaft and is disposed between the pair of thrust bearings on an outer surface of an end of the roller shaft;
   a step surface that is formed on an inner surface of the roller annular groove member and disposed opposite to the thrust bearing portion holding a first one of the pair of thrust bearings in between; and
   a thrust facing member having an threaded outer surface thereof which is in mesh with an inner surface of the roller annular groove member and disposed across a second one of the pair of thrust bearings from the thrust bearing portion, the thrust facing member being spaced a distance from the step surface, the distance being alterable.

2. The mechanism for converting rotary motion into linear motion according to claim 1, further comprising a locking nut that meshes with the outer surface of the thrust facing member and presses against the roller annular groove member in order to fix the outer surface of the thrust facing member to the inner surface of the roller annular groove member.

3. The mechanism for converting rotary motion into linear motion according to claim 1, further comprising a motor that is coupled together with the holder member to make the holder member revolve around the rod, wherein the holder member makes linear motion in an axial direction of the rod.

4. The mechanism for converting rotary motion into linear motion according to claim 3, further comprising a controller for acquiring a measured value of the motor current and a desired target torque value, calculating a target value of the motor current based on the measured value of the motor current and the target torque value, and supplying the current of the target value to the motor,
   wherein the controller, in a case when the measured value is larger than or equal to a predetermined value, restricts the target value in the predetermined value.

5. The mechanism for converting rotary motion into linear motion according to claim 3 further comprising: a cylindrical casing for holding the holder member so as to allow the holder member to make rotation relative to the cylindrical casing, and an outer cylinder for holding the casing so as to allow the casing to make linear motion relative to the outer cylinder,
   wherein the holder member, when the motor rotates, makes linear motion in the outer cylinder in the axial direction of the rod together with the casing while rotating relative to the casing.

6. A lifting device comprising a mechanism for converting rotary motion into linear motion according to claim 1.

* * * * *